United States Patent [19]

Schwaiger

[11] Patent Number: 5,444,720
[45] Date of Patent: Aug. 22, 1995

[54] METHOD FOR THE TRANSMISSION OF ITEMS OF AUXILIARY INFORMATION IN AN AM RADIO BROADCAST SIGNAL

[75] Inventor: Karl-Heinz Schwaiger, Ismaning, Germany

[73] Assignee: Telefunken, Fernseh und Rundfunk GmbH, Hanover, Germany

[21] Appl. No.: 75,976

[22] Filed: Jun. 11, 1993

[30] Foreign Application Priority Data

Dec. 12, 1990 [DE] Germany .................. 40 39 673.8

[51] Int. Cl.⁶ .............................. H03M 13/00
[52] U.S. Cl. .............................. 371/42; 371/46; 371/68.2
[58] Field of Search ............ 371/20.1, 32, 42, 46, 371/68.2

[56] References Cited

U.S. PATENT DOCUMENTS 4,271,520  6/1981  Coombes et al. ............... 371/42

OTHER PUBLICATIONS

Principles Of Data Communication, by R. W. Lucky of Bell Lab. pp. 366 to 369.
*The 8086/8088 Family: Design, Programming, and Interfacing* by John Uffenbeck, ©1987 by Prentice-Hall Inc. pp. 517–521.
Daten neben dem Horfunk, Mittelwelle und Langwelle, 202 Funkschau 62 (1990) 20 Apr., No. 9 Munchen, pp. 48 to 51.
Radio-Daten-System; Neue Entwicklung auf Horfunkwellen, 202 Funkschau 58 (1986) Jan., No. 1 Munchen, Deutschland pp. 43–47.
579 RTM Rundfunktechnusche Mitteilungen 33 (1989) Sep./Oct., No. 5 Norderstedt, pp. 214 to 226.
The Radio Dystem-Traffic Channel, Peter Davis, Vehicle Navagiation Information Systems, Sep. 11-13, 1989, pp. A44-A48.
Electronics Letters, Institute Of Electrical Engineers, vol. 19 No. 3, Feb. 3, 1983, pp. 109 & 110.

*Primary Examiner*—Vincent P. Canney
*Attorney, Agent, or Firm*—Joseph S. Tripoli; Eric P. Herrmann; Gregory G. Gadson

[57] ABSTRACT

Items of auxiliary information are transmitted in an AM radio broadcast signal by phase angle modulating the AM carrier with digitally encoded data representing the auxiliary information. The items of auxiliary information are allocated to a cyclically recurring number of groups, each group consists of two equal length information blocks. Each information block includes an information word and a check word. Different offset words are superimposed on the respective ones of the check words. The offset words are useful for the synchronization of the information blocks in a receiver.

11 Claims, 3 Drawing Sheets

METHOD FOR THE TRANSMISSION OF ITEMS OF AUXILIARY INFORMATION IN AN AM RADIO BROADCAST SIGNAL

This is a continuation of PCT application PCT/EP 91/02375, tilted "Process For Transmitting Additional Information With An A.M. Radio Signal" and filed Dec. 11, 1991 by Karl-Heinz Schwaiger.

FIELD OF THE INVENTION

The invention relates to an auxiliary information signal in accordance with the first part of claim 1. A signal of this type is known from the research report BBC RD 1982/2 from the British Broadcasting Corporation "L. F. Radio Data: Specification of the BBC experimental transmissions 1982" of August 1982.

BACKGROUND OF THE INVENTION

From the said research report, it is known to transmit digitally coded items of auxiliary information in an AM (amplitude modulated) radio broadcast signal by phase modulation and demodulation of the AM radio broadcast signal carrier. In order not to interfere with the programme signal of the phase modulated AM carrier, a value of ±22.5° was selected by the British Broadcasting Corporation as the maximum permissible phase displacement which corresponded to a transmission capacity of 25 bit/s for the items of auxiliary information. This particularly small channel capacity requires an error protection which is matched as optimally as possible to the properties of the AM radio broadcast transmission channel in the sense of a low redundancy. To this end, the data stream is subdivided into blocks each having a length of 50 bits wherein each block consists of a synchronisation bit, an information word of 36 bits and a check word of 13 bits. An optimal error correcting code with which an error burst up to a length of 6 bits can be corrected is used for the block coding. The selected code is cyclical which is shortened to the block length of 50 bits. The synchronisation bit is placed in front of the block at the transmitting end in order to be able to recognise the start of the block with certainty but due to this the cyclical character of the block code is destroyed. A 4 bit wide block application code is transmitted at the beginning of the information word directly behind the synchronisation bit in order to identify the content of the 32 bit long information word. A special information coding in association with the block utilisation code 0000 is provided within the information word just for information regarding the time and the date.

As opposed to this, the object of the invention consists in reducing the redundancy in an auxiliary information signal of the type mentioned hereinabove as well as in simplifying the allocation and thus the recognition of different items of information.

SUMMARY OF THE INVENTION

The invention concerns a method for forming a digitally coded auxiliary information signal for the transmission of items of auxiliary information in an AM radio broadcast signal in which an AM radio broadcast signal carrier is phase angle modulated by the digitally coded auxiliary information signal, comprising the steps of: allocating the items of auxiliary information to a cyclically recurring number of groups; providing for each information block an information word and a check word; and superimposing different offset words useful for the synchronization of the information blocks in a receiver on respective ones of the two check words of each group.

The invention will be explained more fully hereinafter by means of the embodiments illustrated in the drawings.

DETAILED DESCRIPTION OF THE INVENTION

The auxiliary signal format will be described in sections identified by decimal section numbers.

1. BASE BAND CODING

1.1 Structure of the Base Band Coding

Figure 1:
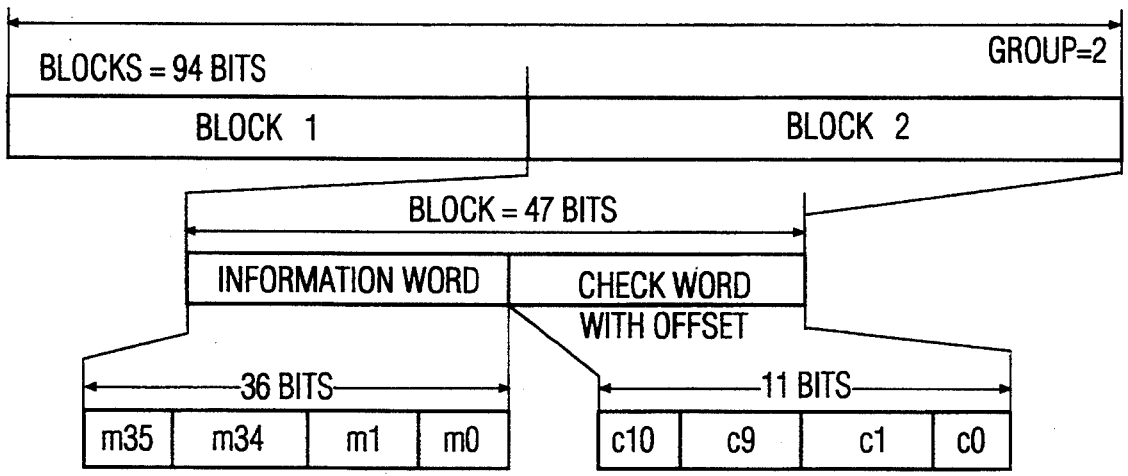
FIG. 1 illustrates the structure of the base band coding scheme of the present invention.

FIG. 1 shows the structure of the base band coding. The largest element within the structure is called a group. A group consists of 2 blocks each of 47 bits. Each block contains an information word (36 bits) and a check word (11 bits). An offset word (11 bits) is superimposed (Modulo 2 addition) on each check word for distinguishing the blocks of a group and for ensuring block synchronisation.

1.2 Features of the Data Transmission

The most significant bit is transmitted first for all of the information words, check words, binary digits or addresses (Diagram 2) . The last transmitted bit of a binary digit or address has the significance $2^0$.

The data transmission is fully synchronous i.e. there are no gaps between groups or blocks.

| Explanation of terms: | | |
| --- | --- | --- |
| GT | Group Type code | (4 bits) see 2.2 |
| PI code | Programme Chain code | (16 bits) see 2.1 |
| Check word | for error protection, block and group synchronisation | (11 bits) see 1.3 |
| X | not used capacity  see 2.2.1–2.2.5 | |

Block 1 of each individual group is transmitted first.

1.3. Error Protection

For the detection and correction of transmission errors in the receiver/decoder, each block has a check word (11 bits). This check word ($c_{10}$, $c_9$, . . . , $c_0$ in FIG. 1 is the sum (modulo 2) of:

a) The remainder after multiplication of the 36 bit information word $m(x)$ by $x^{11}$ and subsequent division (modulo 2) by the generator polynomial $g(x)$ and
b) an 11 bit binary sequence d(x), called the offset word or $$\text{check word } c(x) = d(x) + \frac{m(x) \times 11}{g(x)} \mod g(x)$$

wherein the generator polynomial (Grad 11) is described by the following equation:

$$g(x) = x\,11 + x\,8x + 6 + 1$$

and different offset words are used for each block within a group.

The 11 bit binary sequence for the offset words A and B is defined as follows:

| Offset | Offset word d(x) | | | | | | | | | | |
|---|---|---|---|---|---|---|---|---|---|---|---|
|  | d10 | d9 | d8 | d7 | d6 | d5 | d4 | d3 | d2 | d1 | d0 |
| A | 0 | 1 | 0 | 1 | 1 | 0 | 1 | 0 | 1 | 0 | 1 |
| B | 1 | 0 | 1 | 1 | 0 | 1 | 0 | 1 | 0 | 1 | 1 |

The error protecting code has the following properties:
- detects every single and double error in a block
- detects every single error burst up to 11 bits
- detects approximately 99.90% of the error bursts having 11 bits and approximately 99.95% of all longer bursts The code is also an optimal error correcting code for error bursts up to a length of 5 bits. At the receiving end, either the error detection or the error correction or even both can be utilised independently of the number of the errors in a block or in the content of a block.

1.4 Block and Group Synchronisation

By the use of the two offset words A and B, both the beginning and the end of a block as well as the beginning and end of a group can be detected in the receiver. The offset words destroy the cyclic nature of the original codes so that cyclical displacements of code words of the modified codes do not allow any other code words to be created and thus make this type of block synchronisation reliable.

2. DATA FORMAT

2.1 Definitions for the Data Transmission

There is no fixed repetition rate for the different types of group (see 2.2) i.e. there is sufficient flexibility for combining the different types of information such that they meet the needs of the user.

The data format selected still has 10 free group types and thus sufficient matching capabilities to also allow for future applications.

In order to ensure an effective utilisation of the channel, as few different types of information as possible are mixed in a group. Thereby, the user is not forced to waste channel capacity through the transmission of unused items of information.

The first 4 bits in each block are allocated to the group type code (see 2.2.) which specifies the application of the group. By this means it is possible to decode each block of a group in the receiver/decoder without reference to another block. Consequently, the access time for items of information which are divided across a plurality of blocks is reduced in the event of interference with the transmission.

At any given moment, the first group of a block contains the programme chain code PI.

PI CODE

The PI code (programme chain code) consists of a code (16 bits) which enables the receiver to make a distinction between nationality, programme region/language region and programme code. The PI code is not intended for direct display, it is individually allocated to each radio programme and serves for the recognition of transmitters which send out the same programme. The receiver/decoder is thereby placed in a position where it can automatically search for an alternative frequency in the event that the currently tuned transmitter is too bad for mobile reception.

The following codings enable 256 countries, 16 programme regions and 16 programmes to be distinguished.

Bits 1–8 Nationality code
Bits 9–12 Programme region code/language regions
Bits 13–16 Programme code The abbreviation for the current country can be derived from the nationality code of the PI code and be displayed on the indicator in the receiver.

2.2 Group Types

Figure 2:
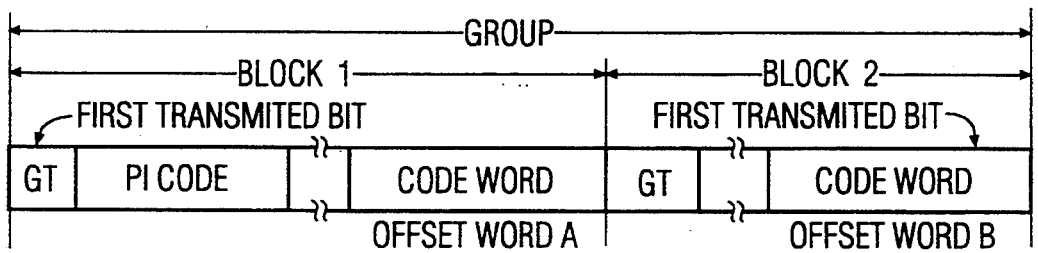
FIG. 2 illustrates the data format and addressing scheme of the present invention.
Figure 2:
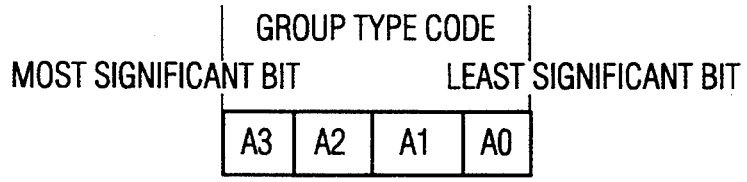

The group type code—the first 4 bits of a block (FIG. 2)—determines the application of the group. The previously defined types of group can be gathered from the following table.

| | Group Type Code | | | | |
|---|---|---|---|---|---|
| Decimal | Binary code | | | | |
| value | A3 | A2 | A1 | A0 | Application |
| 0 | 0 | 0 | 0 | 0 | PS Name of the programme chain |
| 1 | 0 | 0 | 0 | 1 | RT Radio text |
| 2 | 0 | 0 | 1 | 0 | AF Alternative frequencies |
| 3 | 0 | 0 | 1 | 1 | TMC Traffic Message Channel |
| 4 | 0 | 1 | 0 | 0 | IH Internal radio broadcast applications |
| . | . | . | . | . | not defined |
| 15 | 1 | 1 | 1 | 1 | |

TABLE 1

| Group Types | | |
|---|---|---|
| 2.2.1 | Group Type 0 | |
| | Name of the programme chain | PS |
| | Switching information | TMC, TP, TA |

Figure 3:
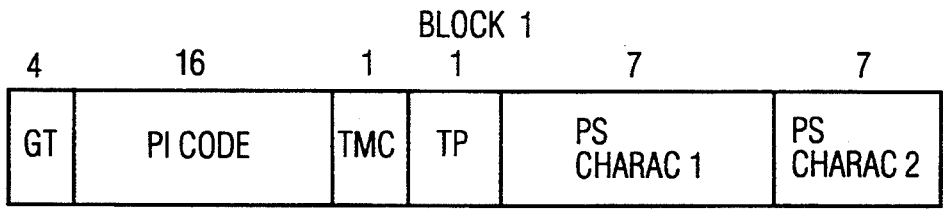
FIG. 3 illustrates the data format of group type 0 of the present invention.
Figure 3:
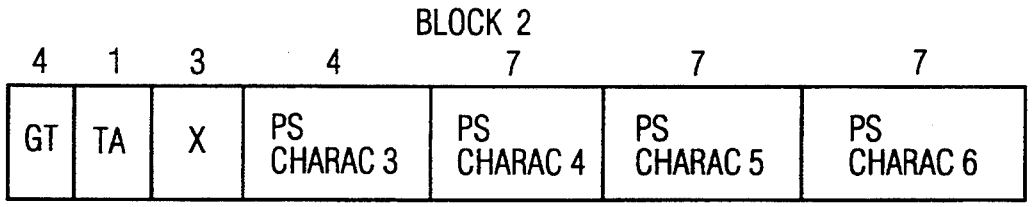

FIG. 3 depicts the data format of the group type 0.

PS

The name of the programme chain for the display in the receiver is transmitted in accordance with the code tables ISO 646 as 7 bit characters (Table 2, columns 2–7). 6 characters including empty places are provided for the name. The position of the individual characters in the name is in correspondence with the appended number. The transmission of the name begins with character 1. The most significant bit of each character is transmitted first. Receivers having a display of more than 6 characters could additionally indicate the current nationality abbreviation (see 2.1 PI code).

TMC

TMC (Traffic Message Channel) is a switching signal which denotes transmitters that transmit coded traffic reports from time to time. The code can be made use of for an automatic search for TMC transmitters.

TP

TP (Radio Traffic Service code) is a switching signal which denotes transmitters that transmit verbal traffic reports from time to time. It can be indicated in the receiver with the aid of a lamp or a corresponding device that the programme being received transmits traffic reports at certain times. The code can be made use of for an automatic search for radio traffic service transmitters.

TA

TA (Traffic announcement code) is a switching signal for indicating whether a traffic announcement is being sent out. The signal can be used in the receiver in the following manner:
- automatically switching on the traffic announcement if the receiver is ready for reception but is muted;
- automatically switching over from cassette reproduction to the traffic announcement;

2.2.2 Group Type 1 Radio Text RT

Figure 4:
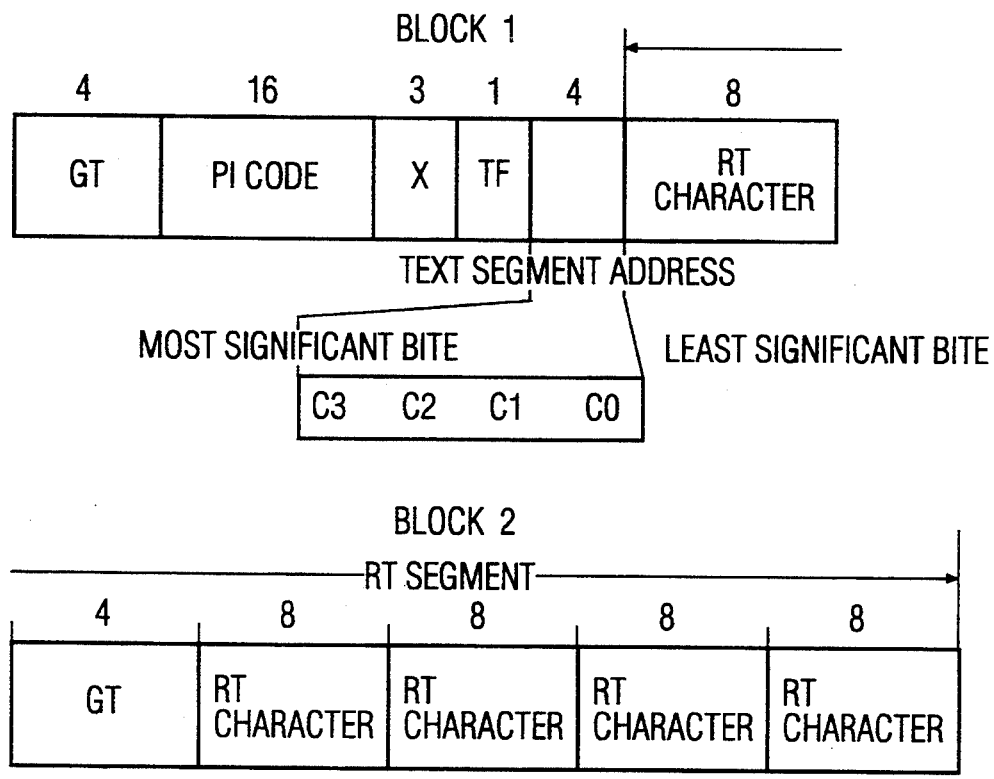
FIG. 4 illustrates the data format of group type 1 of the present invention.

FIG. 4 depicts the data format for the group type 1.

The radio text is transmitted with 8 bit characters in accordance with the code tables ISO 646 (see Table 2). The transmission begins with the most significant bit of a character.

The text segment address in block 1 serves for arranging the text segments in order; consisting of the characters from block 1 and 2, in a display or in a memory. Radio texts up to a length of 80 characters can be transmitted through the range of the segment addresses (0–15) and the characters (5) contained in a group.

If a display having fewer than 80 characters is used for RT, then a memory should be provided in the receiver/decoder so that portions of the message can be displayed one after the other.

A change of the text flag (TF) in block 1 signifies the transmission of a new radio text. The text flag is made use of in the receiver/decoder for clearing the display or the memory.

RT is intended above all for home receivers having a suitable display and for car receivers e.g. for the control of a speech generator.

2.2.3 Group Type 2 Alternative Frequencies AF

Figure 5:
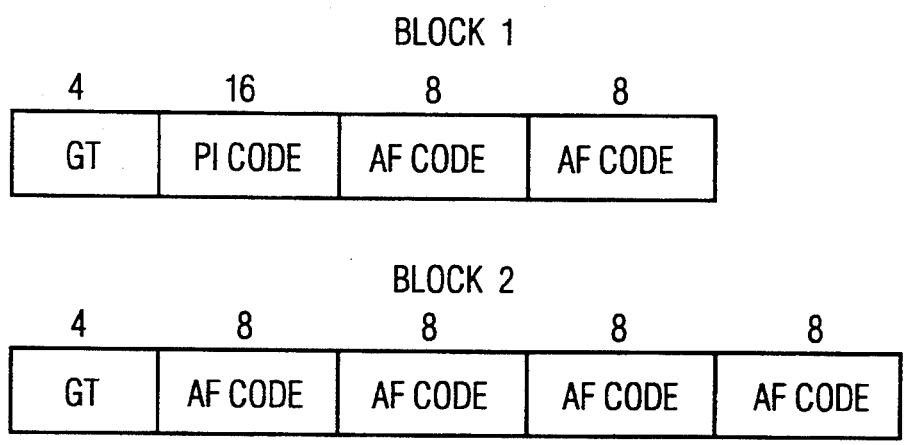
FIG. 5 illustrates the data format of group type 2 of the present invention.

FIG. 5 depicts the data format for the group type 2.

2.2.4 Codes for Alternative Frequencies

Long and Medium Wave

Long and Medium wave frequencies are represented in the raster of 9 kHz by an 8 bit code.

| Number | Binary Code | Carrier Frequency |
|---|---|---|
| 1 | 0000 0001 | 153 kHz |
| 15 | 0000 1111 | 279 kHz |
| 16 | 0001 0000 | 531 kHz |
| 135 | 1000 0111 | 1602 kHz |

Short Wave

The frequencies of the short waves are represented in the raster of 5 kHz by two 8 bit codes. They are characterised in that the first 8 bit code lies in the range 140–157. In this case, the first code is to be evaluated in pairs with the following code. Pairs extending beyond a block are not permissible.

| Number | Binary Code | Number | Binary Code | Carrier Frequency |
|---|---|---|---|---|
| 140 | 1000 1100 | 0 | 0000 0000 | 3980 kHz |
| 157 | 1001 1101 | 190 | 1011 1110 | 26100 kHz |

Very High Frequency

The VHF channels are represented in the raster of 100 kHz by two 8 bit codes. They are characterised in that the first 8 bit code is =160. In this case, the code with the following code signifies a VHF channel. Pairs extending beyond a block are not permissible.

| Number | Binary Code | Number | Binary Code | Carrier Frequency |
|---|---|---|---|---|
| 160 | 1010 0000 | 0 | 0000 0000 | 87.5 MHz |
| 160 | 1010 0000 | 204 | 1100 1101 | 107.9 MHz |

Number and Filler Codes

The number code indicates how many frequencies excluding filler codes are contained in an AF list. An AF list may contain up to 31 frequencies. The number code is transmitted at the beginning of an AF list.

The filler code is used for occupying non-utilised AF codes within the group.

| Number | Binary Code | Application |
|---|---|---|
| 136 | 1000 1000 | Filler code |
| 224 | 1110 0000 | no AF |
| 241 | 1110 0001 | AF list having 1 frequency |
| 255 | 1111 1111 | AF list having 31 frequencies |

The list of the alternative frequencies provides an indication as to which transmitters in the same or neighbouring reception areas emit the same programme. Receivers/decoders including a store for AF lists can thus shorten the switch-over time to another transmitter.

2.2.4 Group Type 3

Traffic Message Channel TMC

Alternative Frequencies for TMC AFT

Figure 6:
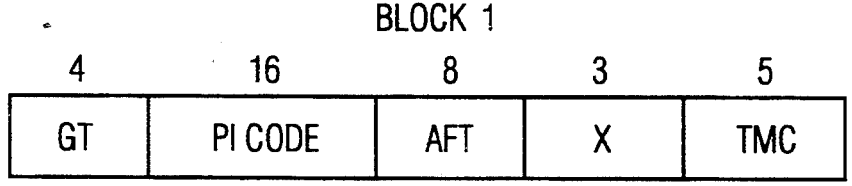
FIG. 6 illustrates the data format of group type 3 of the present invention.
Figure 6:
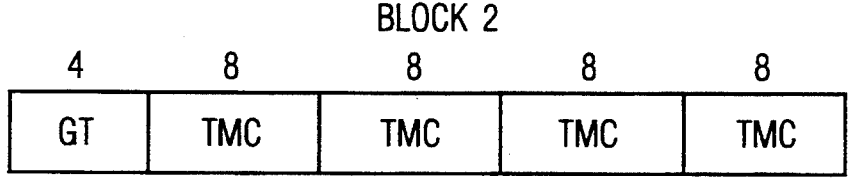

FIG. 6 depicts the data format for the group type 3. The data format takes into account the proposal from the Company Blaupunkt and that of the EBU as regards the length of the information (37 bits).

The alternative frequencies for TMC (AFT) refer only to transmitters having the same coded traffic reports. These transmitters do not emit the same sound programme. The AFT is based on the same coding as for the alternative frequencies (AF). The application of the AFT is restricted to LW and MW frequencies.

2.2.5 Group Type 4 Internal Broadcast Information IH

Figure 7:
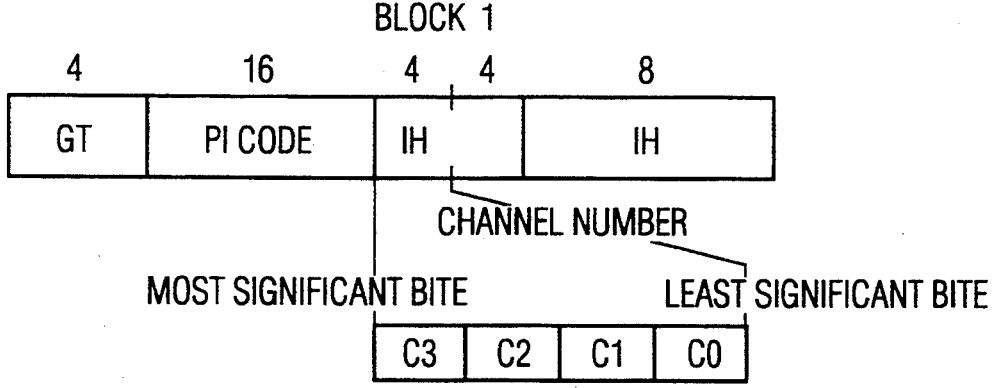
FIG. 7 illustrates the data format of group type 4 of the present invention.
Figure 7:
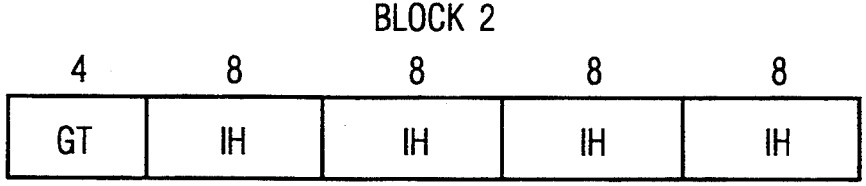

FIG. 7 depicts the data format for the group type 4. 48 bits, 16 bits in block 1 and 32 bits in block 2 are available for IH. The content of the bits occupied by IH may be determined by the broadcasting authority itself. For this, a data format similar to that for RDS seems to be appropriate. The first 4 IH bits of block 1 are used as channel numbers 0 to 15. The remaining 44 bits are considered as 11 Hex characters and are available for a bit transparent data transmission.

Examples for the application of IH:
Programme source code
Remote control of transmitter nets
Personnel bleeper for operating staff

I claim:

1. A method for forming a digitally encoded auxiliary information signal for the transmission of items of auxiliary information in an AM radio broadcast signal in which an AM radio broadcast signal carrier is phase angle modulated by said digitally coded auxiliary information signal, comprising the steps of:

allocating the items of auxiliary information to a cyclically recurring number of groups each consisting of two equal length information blocks;

providing for each information block an information word and a check word each consisting of a specific number of data bits; and superimposing different offset words for synchronizing said information blocks on respective ones of said two check words.

2. The method in accordance with claim 1, further comprising:

including within each of the two information words within each group a group type code identifying the respective group at the beginning of the word.

3. The method in accordance with claim 1, further comprising:

including a program identification code identifying the program chain of the AM radio broadcast signal concerned in the first information block of each group.

4. The method in accordance with claim 1, further comprising:

including a program service code identifying the name of the program chain of the AM radio broadcast signal concerned in a first group of the cycle.

5. The method in accordance with claim 4, further comprising:

including further codes for the identification of the transmitter of the AM radio broadcast signal concerned as a transmitter for coded traffic reports and as a radio traffic service transmitter; and including a switching signal accompanying an uncoded traffic report in the same group of the cycle in which the program service code is transmitted.

6. The method in accordance with claim 1, further comprising:

including items of radio text information in the form of a sequence of addressed text segments in a second group of the cycle; and including a binary erase signal which alters its binary state as soon as a previously transmitted text is to be replaced by a new text before each new text segment.

7. The method in accordance with claim 1, further comprising:

including items of information regarding alternative frequencies of the transmitters which emit the same program as the current AM radio broadcast signal transmitter in a third group of the cycle; each item of alternative frequency information including an additional code for the wave band of the alternative frequency concerned; and said items of alternative frequency information are included in lists in which the number of items of alternative frequency information within the list is included at the beginning of the list.

8. The method in accordance with claim 1, further comprising:

including coded traffic reports as well as items of information regarding the frequencies of alternative transmitters which emit the same coded traffic reports in a fourth group of the cycle; each item of alternative frequency information including an additional code for the wave band of the frequency concerned for the alternative transmitter; and said items of alternative frequency information are included in lists in which the number of items of alternative frequency information within the list is included at the beginning of the list.

9. The method in accordance with claim 1, further comprising:

including internal items of information for the radio broadcast in a fifth group of the cycle.

10. The method in accordance with claim 8, further comprising:

providing for at least one short term switching of the band if an item of alternate frequency information includes an additional code for the wave band of the alternative frequency concerned.

11. The method in accordance with claim 8, further comprising:

providing for the selection of a VHF frequency as a priority frequency if an alternate frequency code includes an additional code for the VHF wave band of the alternative frequency concerned.

* * * * *